United States Patent [19]
Fulghum et al.

[11] Patent Number: 5,430,775
[45] Date of Patent: Jul. 4, 1995

[54] METHOD AND APPARATUS FOR A RADIO COMMUNICATION SYSTEM

[75] Inventors: Tracy L. Fulghum, Sunrise; Jimmy W. Cadd, Coral Springs, both of Fla.

[73] Assignee: Motorola, Inc., Schaumburg, Ill.

[21] Appl. No.: 186,938

[22] Filed: Jan. 27, 1994

[51] Int. Cl.[6] .............................................. H04B 1/713
[52] U.S. Cl. ........................................ 375/202; 380/34
[58] Field of Search .................. 375/1; 380/34, 49, 46

[56] References Cited

U.S. PATENT DOCUMENTS

| | | | |
|---|---|---|---|
| 4,554,668 | 11/1985 | Deman et al. | 375/1 |
| 4,556,404 | 5/1986 | Christy et al. | 375/1 |
| 4,597,087 | 6/1986 | Kadin | 375/1 |
| 4,606,041 | 8/1986 | Kadin | 375/1 |
| 4,612,652 | 9/1986 | Kadin | 375/1 |
| 4,829,540 | 5/1989 | Waggener et al. | 375/1 |
| 5,029,183 | 7/1991 | Tymes | 375/1 |
| 5,067,136 | 11/1991 | Arthur et al. | 375/1 |
| 5,224,121 | 6/1993 | Schorman | 375/1 |
| 5,257,398 | 10/1993 | Schaeffer . | |
| 5,287,384 | 2/1994 | Avery et al. | 375/1 |

*Primary Examiner*—David C. Cain
*Attorney, Agent, or Firm*—Andrew S. Fuller

[57] ABSTRACT

A radio communication system (10) operates over a sequence of communication channels using a synchronized channel hopping protocol. A first communication device (16) is provided which is capable of communicating over the sequence of communication channels using channel hopping, and which has an operating communication channel. A second communication device (13) is provided, which is capable of determining the operating communication channel and channel hopping parameters of the first communication device (16). The second communication device (13) can communicate over the sequence of communication channels using channel hopping synchronized with the channel hopping of the first communication device (16), while selecting an operating communication channel different from the operating communication channel of the first communication device (16) when both communication devices (13, 16) operate simultaneously.

20 Claims, 5 Drawing Sheets

METHOD AND APPARATUS FOR A RADIO COMMUNICATION SYSTEM

TECHNICAL FIELD

This invention relates in general to a radio communication system, and more particular, to a radio communication system having communication devices operating over shared communication channels.

BACKGROUND

Radio communication systems which support communication among several users operating in wireless environment over radio frequencies are known. The frequencies used by these systems are a subset of the radio frequency spectrum which are organized into one or more radio communication channels, such as frequency channels. In such a system, for example, a communication link may be established between groups of communication devices within the radio system. The communication link is established over one or more frequency channels for the duration of the communication. Generally, the frequency spectrum available for a given radio system is a limited communication resource, and several users may be competing for this resource. Thus, a radio communication system typically employs a frequency management methodology in order to maximize the efficient use of the available frequencies, and to minimize interference among users. This approach is essential where multiple communication links must be established over shared communication channels.

Many frequency management methodologies are known in the art. Channel hopping, or frequency hopping, is an example of one such methodology. In a channel hopping scheme, groups of communicating devices periodically change the frequency channel on which they are operating. A maximum period of time for which a communicating device may utilize a given frequency channel may be prescribed in order to maximize access and minimize interference among users. Other frequency management methodologies include direct sequence spread spectrum, time division multiplex, and other similar schemes. Most prior art frequency management methods employ an infrastructure to control the operational aspects of the radio system. An infrastructure typically includes a base station, or some other type of controller, which manages frequency assignments, user access, and other operational aspects of a radio system. These controllers tend to represent a significant cost in the establishment of a radio communication system.

Low cost radio communication systems are becoming an increasingly important segment of the wireless communication market. These low cost systems must also successfully manage frequency allocation among users in order to maximize efficiency and throughput. Therefore, it is desirable to have a low cost radio communication system which promotes efficient use of shared communication resources.

DETAILED DESCRIPTION OF THE PREFERRED EMBODIMENT

Figure 1:
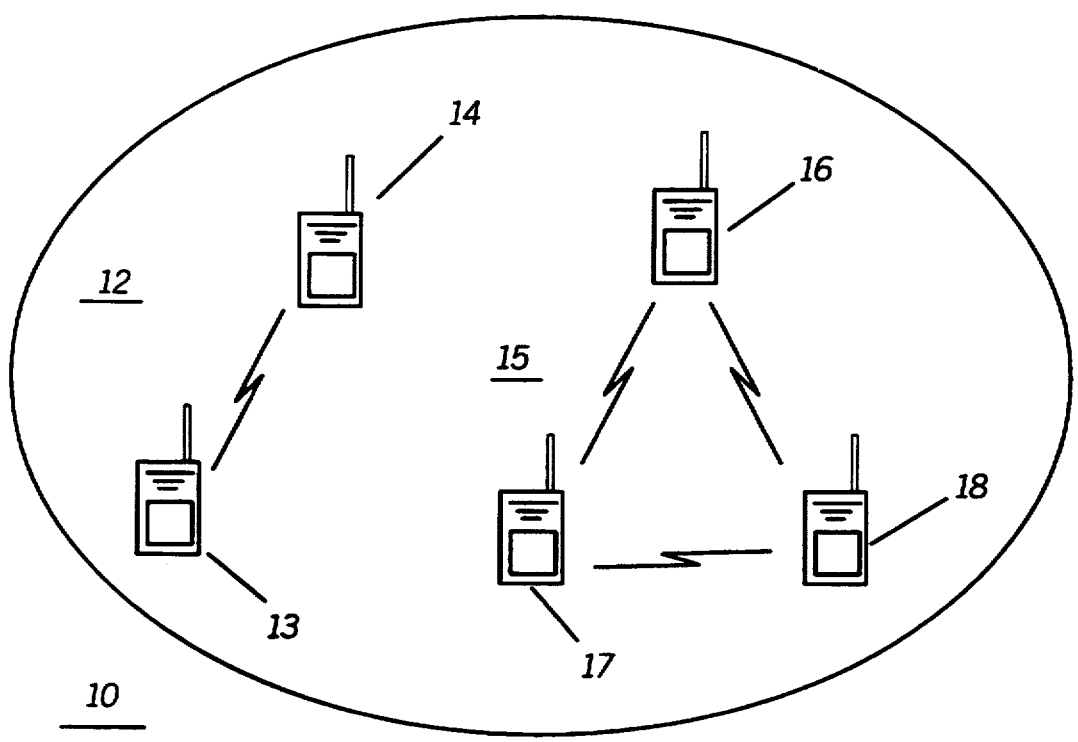
FIG. 1 is a radio communication system having two groups of communicating transceivers, in accordance with the present invention.

Referring to FIG. 1, a radio communication system 10 having different groups of communication devices, such as transceivers, operating under a communication channel hopping protocol is shown, in accordance with the present invention. In the preferred embodiment, the communication devices are two-way portable radio transceivers capable of establishing radio frequency (RF) communication links. Other types of communication devices may be used, such as mobile radios, base stations, repeaters, and the like. The radio system 10 depicted has two groups 12, 15 of communicating transceivers. A first group 12 includes two transceivers 13, 14 with an established communication link between them. A second group 15 includes three transceivers 16, 17, 18 also communicating over an established communication link. The present invention recognizes that interference between the groups of transceivers 12, 15 is likely if both groups of transceivers 12, 15 are operating independently. For example, both groups 12, 15 may be channel hopping over the same sequence of communication channels, or on sequences which overlap. The interference would be significant if the communicating groups 12, 15 were sufficiently close to each other, and were attempting to channel hop simultaneously through the same communication channels. Obviously, a more efficient radio communication system would result if these communicating groups were organized so as to not to interfere with each other. Ordinarily, such is the task of a controller or base station in a managed sophisticated radio communication system. However, if there is no such infrastructure support, the solution becomes more difficult.

According to the present invention, both groups of transceivers 12, 15 channel hop among a predetermined sequence of communication channels. In the preferred embodiment, the communication channels comprise a plurality of frequencies organized into a sequence of frequency channels. The frequencies are a subset of the frequency spectrum available for radio communication. The communication channel may comprise one or more frequency channels, such as a transmit and receive frequency pair, or a similar grouping. A prescribed hop period, i.e., the period of time which a transceiver, or group of transceivers, may spend continuously utilizing a given communication channel, is also defined. The channel hopping of the first group 12, including the hop period and sequence, is synchronized with the channel hopping of the second group 15. The synchronous operation between the groups 12, 15 is achieved using individual transceivers 13, 14, 16, 17, 18, using a protocol taught by the present invention, the details of which will be described below. The result is a self-organizing radio communication system 10 which does not require a central controller, such as a base station, for frequency allocation and access management.

Figure 2:
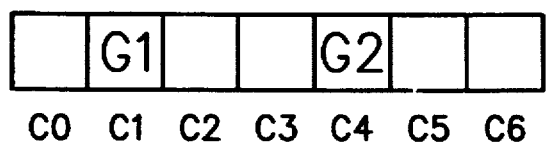
FIG. 2 is a representation of a sequence of seven communication channels, according to the present invention.

FIG. 2 represents a sequence of seven communication channels labeled C0, C1, C2, C3, C4, C5, C6, utilized by the radio communication system 10. Note that there is no requirement that these communication channels be physically adjacent. Two groups of communicating transceivers G1, G2, corresponding to the first and second groups 12, 15 of FIG. 1, are operating on communication channel C1 and C4, respectively. The radio system is organized using radio transceivers having the capability of channel hopping among the communication channels of the sequence of communication channels, i.e., C0 through C6. Thus, once a communication link has been established among transceivers of a group, these communicating transceivers maintain the link by simultaneously channel hopping among the communication channels of the sequence.

Figure 3:
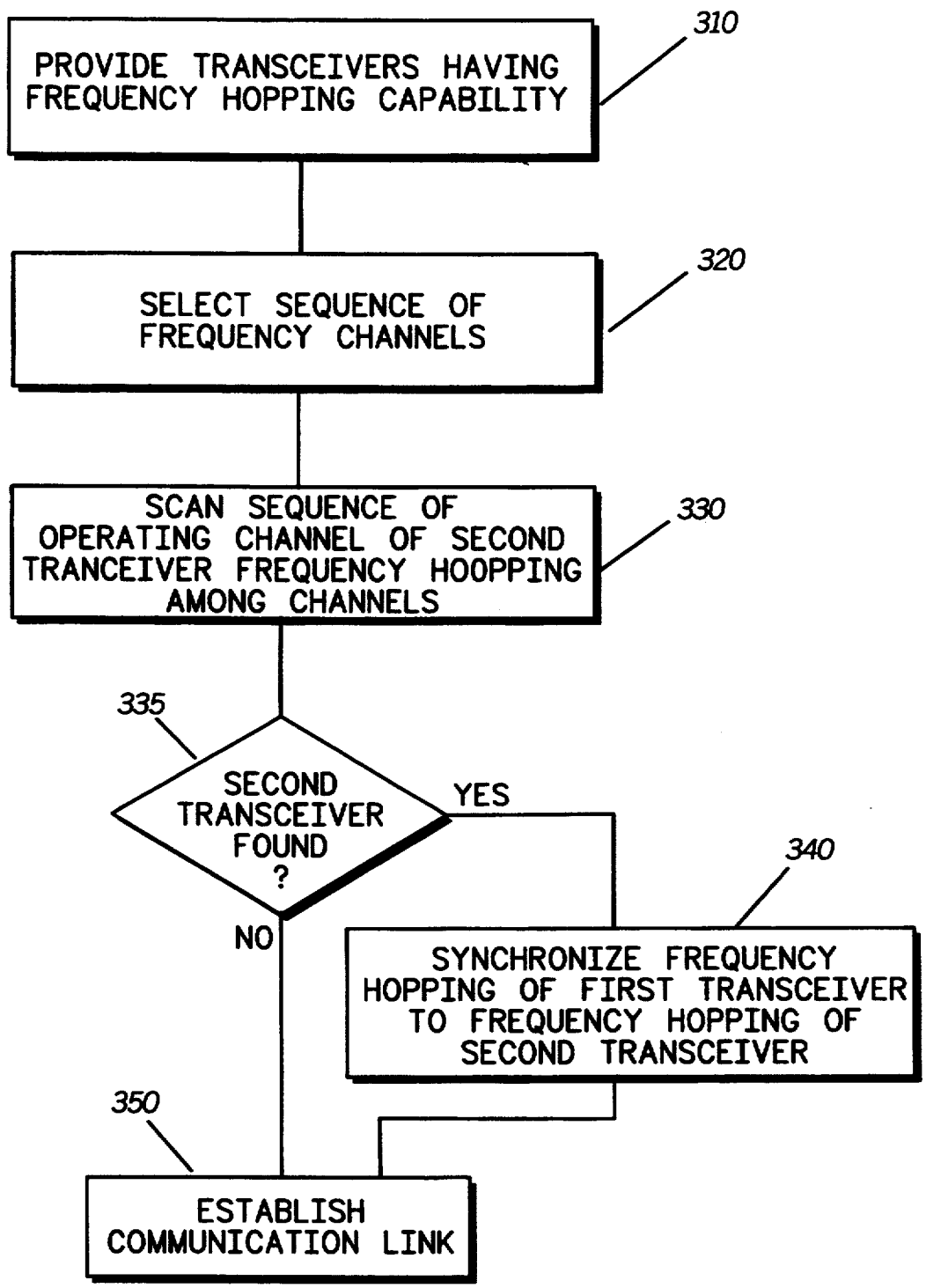
FIG. 3 is a flowchart of a sequence of seven communication channels.

Referring to FIG. 3, the steps needed to establish a radio system according to the present invention is shown. As indicated earlier, transceivers wishing to participate in the radio system must have circuitry to support a channel hopping protocol, step 310. An initiating transceiver, for example, transceiver 13 of FIG. 1, first selects the sequence of communication channels on which it wishes to establish a communication link, step 320. Next, the initiating transceiver scans the communication channels of the sequence to determine whether other communication links have been established, which would indicate the presence of a radio system organized according to the present invention, step 330. As there is no requirement that transceivers operating under the radio system have exclusive use of communication channels of the sequence, the initiating transceiver may have to locate and interpret identification information which would identify transceivers operating under the radio system.

The simple case is presented if there are no current communication links currently established on the sequence of communication channels, i.e., there is no active radio system. Accordingly, the initiating transceiver establishes a communication link, step 350. For example, the link may be created by placing a call on one of the communication channels of the sequence, such as C1, which is expected to be monitored by a targeted transceiver, for example, transceiver 14 of FIG. 1. The communication link is completed when the targeted transceiver receives the call. Once the communication link is established, both transceivers channel hop in unison through the sequence of communication channels until the communication link is broken.

If one or more groups of transceivers have already established communication links on the sequence of communication channels under the radio system, the initiating transceiver must synchronize to channel hopping of these groups. Since a communication link exists, there will be at least a second transceiver, e.g., transceiver 16 of FIG. 1, communicating over the sequence of communication channels using channel hopping, and having an operating communication channel. The operating communication channel is defined to be the communication channel on which a separate transceiver, or group communicating transceivers, is operating. First, the initiating transceiver scans the sequence to locate the operating communication channel of a second transceiver within one of the communicating groups. In the preferred embodiment, the transceiver scans the communication channels to determine the operating communication channel having the highest receive power level. The initiating transceiver assumes that the communication channel having the highest receive power level indicates the channel having the closest operating transceiver or group of communicating transceivers. Alternatively, the initiating transceiver may scan the communication channels to determine if the receive power level on an operating communication channel exceeded a predetermined threshold. After determining the operating channel of a communicating transceiver, the initiating transceiver then extracts channel hopping parameters including synchronization data embedded in the ongoing transmission. Synchronization data may include the timing and duration of the channel hops. The extracted synchronization information is used by the initiating transceiver to synchronize its transmission on a separate and preferably unoccupied communication channel, step 340. The initiating transceiver then establishes a communication link, step 350, and synchronizes channel hopping with the channel hopping of the communicating transceiver and the other communicating groups. The initiating transceiver also establishes an operating communication channel different from the operating communication channel of the communicating transceiver (or other communicating groups) when both transceivers operate simultaneously.

Figure 4:
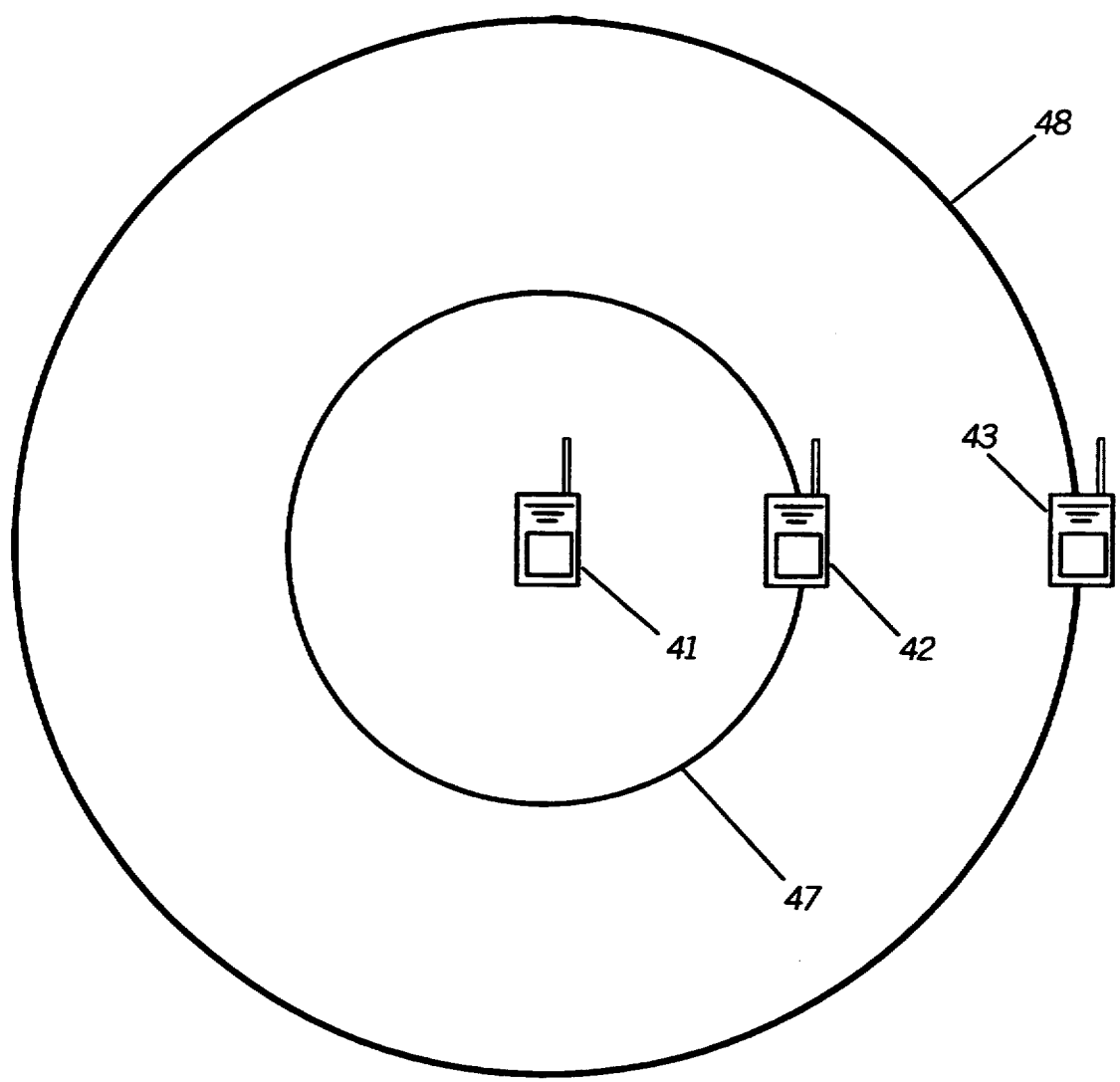
FIG. 4 is a representation of the effect of extending the communication range on the reservation channel.

The establishment of a communication link requires access to a communication channel which the targeted transceiver is monitoring. Accordingly, the present invention provides for a channel access protocol to facilitate this process. The protocol also facilitates the establishment of the initial operating communication channel. One of the communication channels of the sequence is selected as a reservation channel (RC). A monitored communication channel (MCC) is also selected from among the sequence of communication channels. Preferably, the RC and MCC are preselected and are known to transceivers wishing to create, or participate in, the radio system. The RC is used to reserve a time slot for accessing the communication channel which is being monitored by the targeted transceiver. Preferably, the RC is chosen from among the communication channels of the sequence and immediately precedes the MCC. In the preferred embodiment, communication channel C0 is selected as the RC, and the MCC is communication channel C1. To establish a communication link, an initiating transceiver first synchronizes with the channel hopping of a transmitting transceiver or group of transceivers operating on a communication channel as described above. The initiating transceiver then determines if the RC is unoccupied, and if so, reserves a hop period on the MCC by transmitting on the RC. Note that the RC may be occupied by another initiating transceiver, or the RC may currently be the operating communication channel of a transceiver or group of communicating transceivers. Preferably, the communication or transmission range on the RC is extended over the communication range on the other communication channels of the sequence by lowering data transmission rates, by providing more robust transmit symbols, or by increasing the transmit power. The effect of extending the communication range is illustrated in FIG. 4. An initiating transceiver 41 is attempting to establish a communication link with a targeted transceiver 42 operating at the edge of the communication range 47 of the non-RC channels of the sequence. By extending the communication range on the RC, the likelihood of interference from a potential interfering transceiver 43 in the extended range 48 is reduced. Having successfully reserved the MCC, the initiating transceiver 41 then transmits call or identification information on the MCC during the subsequent hop period. The targeted transceiver 42 can then complete the communication link by acknowledging the call.

Figure 5:
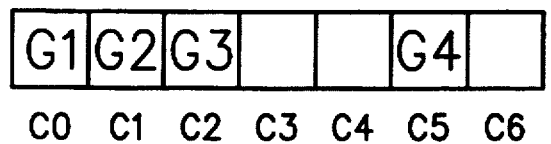
FIG. 5 is the sequence of FIG. 2 having four groups of communicating transceivers.
Figure 6:
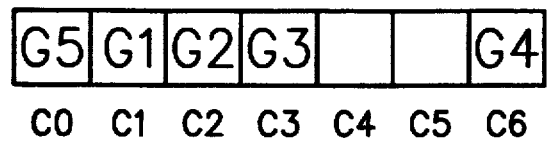
FIG. 6 is the sequence of FIG. 5 after a first channel hop period showing the initiation for a fifth group of communicating transceivers.
Figure 7:
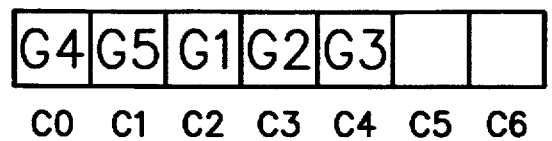
FIG. 7 is the sequence of FIG. 5 after a second hop period and showing the establishment of a fifth group of communicating transceivers.
Figure 8:
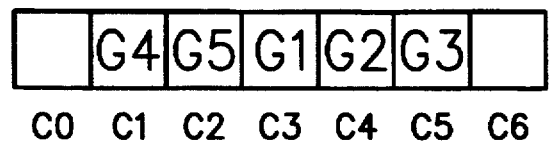
FIG. 8 is the sequence of FIG. 5 after a third hop period.

The RC reservation system will be better understood by referring to FIGS. 5-8. FIG. 5 shows the sequence of communication channels at a given instance of time on which additional groups of communicating transceivers have been added. Communication channels C0, C1, C2, and C5 are occupied by communicating group G1, G2, G3, and G4, respectively. An initiating transceiver has already scanned the sequence to determine channel hop timing and is waiting for communication channel C0 to become available. Communication channel C1 is the MCC, which is being monitored by the targeted transceiver. FIG. 6 shows the sequence of communication channels after a first hop period. Communication channel C0 became available and the initiating transceiver is now transmitting on that channel to reserve the MCC during the next hop period. In FIG. 7, the initiating and targeted transceivers have formed communicating group G5. In the next hop period, FIG. 8, the group G5 synchronously hops with the other communicating groups G1, G2, G3, G4.

Figure 9:
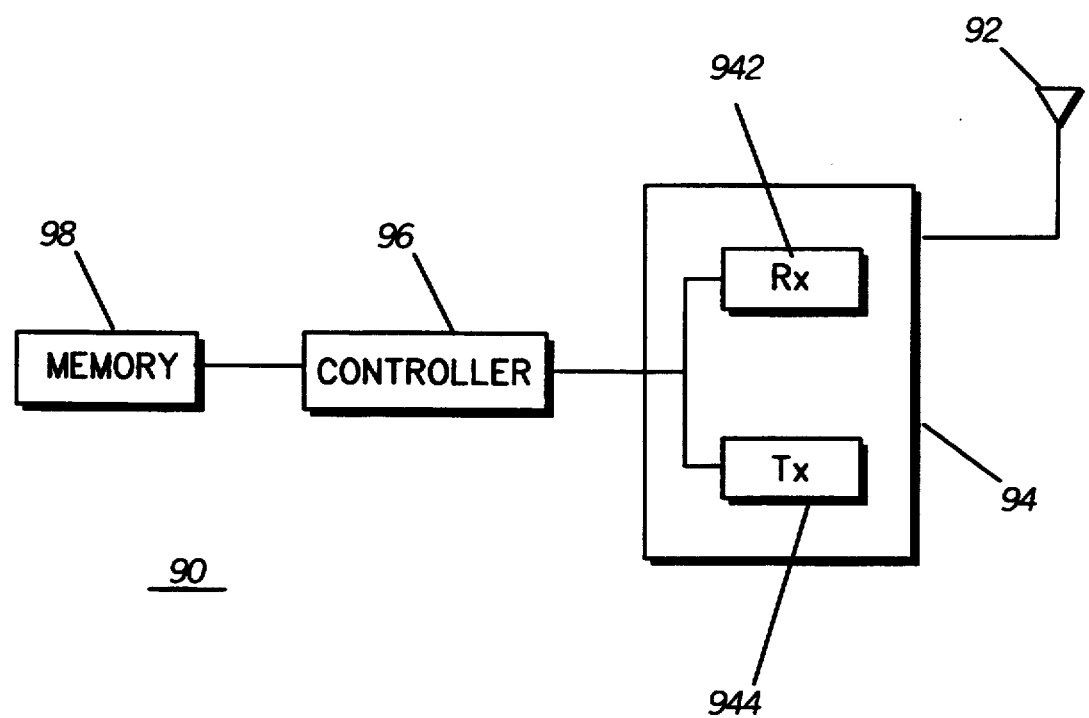
FIG. 9 is a block diagram of a radio capable of organizing a radio communication system, in accordance with the present invention.

FIG. 9 shows a portion diagram of a radio 90 capable of organizing, or participating in, the radio communication system described above, in accordance with the present invention. The transceivers 13, 14, 16, 17, 18, 41, 42, 43 described above are similar in structure and functionality. The radio 90 is an electronic communication device used for two-way communication, and is capable of receive and transmit operation using well known principles. A controller 96 uses logic and other information from an electrically coupled memory portion 98 to control the overall operation of the radio 90. The controller 96 is electrically coupled to an RF portion 94 which includes a receiver 942 and a transmitter 944. The RF portion 94 is electrically coupled to an antenna 92. For receive operations, communication signals are received by the antenna 92 and are selectively processed by the receiver 942. Similarly, for transmit operations, communication signals are processed by the transceiver 944 and radiated through the antenna 92. The transmitter 944 and receiver 942 operate under the control of the controller 96. According to the invention, the controller 96, cooperates with the memory portion 98 and RF portion 94 to performs the communication protocol management functions, including the channel hopping synchronization and the reservation channel access protocol, described above. Thus, the controller 96 operates the radio 90 to receive and transmit signals over a plurality of communication channels and can selectively operate in a channel hopping mode. The controller 96 operates the radio 90 to receive communication signals, such as by scanning the communication channels, to identify the operating communication channel of a second radio 90 or transceiver which is operating under the radio 90 communication system. The radio 90 may choose among potential operating communication channels by using the operating channel having the highest receiver power, or by selecting an operating channel which receive power level exceeds a predetermine threshold. The radio 90 extracts channel hopping parameters including synchronization information from the operating communication channel to synchronize channel hopping with the channel hopping of the second transceiver. Additionally, the radio 90 operates to select an operating communication channel which is different from the operating channel of the second transceiver when the radio 90 and second transceiver are operating simultaneously.

In summary, the present invention provides for a communicating device and a communication channel management protocol. Using the communication device and protocol, two or more communicating groups can be organized to substantially reduce the potential of interference, and to substantially improve the efficient use of communication channels. In the preferred embodiment, a plurality of frequencies are organized into a sequence of communication channels. A first transceiver or group of communicating transceivers operates on the sequence of communication channels by establishing a communication link on one of the available communication channels. A transceiver wishing to form a second group of communicating transceivers first locates the operating frequency of the first communicating group. The initiating transceiver then extracts synchronization data embedded in the ongoing transmission, and synchronizes with the channel hopping of the second group communicating group. The initiating transceiver reserves the communication channel monitored by the targeted transceiver by transmitting on a reservation channel. In the preferred embodiment, the reservation channel is the channel of the sequence before the monitored channel. A communication link can be established when the monitored channel becomes available to the initiating transceiver.

The communicating device and communication channel management protocol described offer several advantages. The communication channel management protocol provides a method for increasing the efficient use of available communication channels while reducing interference between communicating groups. By synchronizing to the channel hopping of other communicating groups, the likelihood of interference is reduced. Additionally, by combining a reservation channel reservation protocol with synchronous channel hopping, access to the system and the assignment of available communication channels are facilitated. Consequently, efficient use of the communication channels is promoted. Yet, this efficient channel utilization is accomplished without the use of a central controller, such as a base station, and the like, because the protocol capability is incorporated into each transceiver. The result is a low cost radio communication system which promotes efficient use of shared communication resources.

What is claimed is:

1. A radio communication system operating over a sequence of communication channels, comprising:
 a first communication device having means for communicating over the sequence of communication channels using channel hopping, and having an operating communication channel; and
 a second communication device, comprising:
  means for scanning among the sequence of communication channels to determine the operating communication channel and channel hopping parameters of the first communication device;

means for communicating over the sequence of communication channels using channel hopping synchronized with the channel hopping of the first communication device; and means for selecting an operating communication channel for the second communication device different from the operating communication channel of the first communication device when both communication devices operate simultaneously.

2. The radio communication system of claim 1, wherein: the second communication device is a portable transceiver.

3. The radio communication system of claim 2, wherein: the first communication device is a portable transceiver.

4. The radio communication system of claim 1, wherein said means for scanning among the sequence of communication channels to identify the operating communication channel of the second transceiver, comprises:

means for determining the operating communication channel having the highest receive power level.

5. The radio communication system of claim 1, wherein said means for scanning among the sequence of communication channels to identify the operating communication channel of the second transceiver, comprises:

means for determining the operating communication channel having a receive power level exceeding a predetermined threshold.

6. The radio communication system of claim 1, wherein said means for selecting an operating communication channel for the second communication device different from the operating communication channel of the first communication device when both communication devices operate simultaneously, comprises:

means for reserving a monitor channel by transmitting on a reservation channel; and means for initiating a communication link on the monitor channel.

7. A method of operating a radio communication system using a channel hopping protocol, the radio communication system having a first transceiver channel hopping among a sequence of communication channels and having an operating communication channel, the method comprising the steps of:

providing a second transceiver having means for channel hopping among the sequence of communication channels;

scanning among the sequence of communication channels to locate the operating communication channel of the first transceiver; and synchronizing channel hopping of the second transceiver with the channel hopping of the first transceiver such that the second transceiver has an operating communication channel different from the operating communication channel of the first transceiver when both transceivers are operating simultaneously.

8. The method of claim 7, wherein the step of scanning, comprises the step of:

scanning the sequence communication channels to determine the communication channel having the highest receive power level.

9. The method of claim 7, wherein the step of scanning, comprises the step of:

scanning the sequence communication channels to determine the channel having a receive power level exceeding a predetermined threshold.

10. The method of claim 7, wherein the step of scanning among the sequence of communication channels to locate the operating communication channel of the second transceiver, comprises the step of:

scanning the plurality of communication channels to determine the communication channel having synchronization data transmissions.

11. The method of claim 7, wherein the step of providing a second transceiver comprises the step of providing a second portable transceiver.

12. The method of claim 10, wherein the step of synchronizing channel hopping of the second transceiver comprises the step of:

selecting a reservation channel and a monitor channel;

reserving the monitor channel by transmitting on the reservation channel;

initiating a communication link on the monitor channel.

13. The method of claim 12, wherein the step of selecting a reservation channel and a monitor channel includes the step of:

selecting a reservation channel and a monitor channel from among the sequence of communication channels.

14. The method of claim 13, wherein the step of reserving the monitor channel by transmitting on the reservation channel includes the step of:

extending communication range on the reservation channel beyond communication range on other communication channels of the sequence.

15. The method of claim 14, wherein the step of extending communication range the reservation channel beyond the communication range over other communication channels of the sequence includes the step of:

lowering data transmission rate on the reservation channel.

16. The method of claim 14, wherein the step of extending transmission range the reservation channel beyond the transmission range over other communication channels of the sequence includes the step of:

providing robust transmit symbols on the reservation channel.

17. The method of claim 14, wherein the step of extending transmission range the reservation channel beyond the transmission range over other communication channels of the sequence includes the step of:

increasing transmit power on the reservation channel.

18. The method of claim 12, wherein the step of selecting a reservation channel and a monitor channel from among the sequence of communication channels includes the step of:

selecting the reservation channel to be the communication channel in the sequence immediately preceding the monitor channel.

19. In a radio communication system using a channel hopping protocol, and having a first transceiver and a second transceiver, the first transceiver channel hopping among a sequence of communication channels and having an operating communication channel, the second transceiver being capable of channel hopping among the sequence of communication channels, a method comprising the steps of:

scanning, by the second transceiver, among the sequence of communication channels to locate the operating communication channel of the first transceiver; and synchronizing channel hopping of the second transceiver with the channel hopping of the first transceiver such that the second transceiver has an operating communication channel different from the operating communication channel of the first transceiver when both transceivers are operating simultaneously.

20. In a radio communication system using a channel hopping protocol, and having a first transceiver and a second transceiver, the first transceiver channel hopping among a sequence of communication channels and having an operating communication channel, the second transceiver being capable of channel hopping among the sequence of communication channels, a method at the second transceiver comprising the steps of:

scanning among the sequence of communication channels to locate the operating communication channel of the first transceiver;

synchronizing channel hopping of the second transceiver with the channel hopping of the first transceiver;

selecting a reservation channel from among the sequence of communication channels;

reserving a communication slot by transmitting on the reservation channel in an extended range mode; and operating within the communication slot such that the second transceiver has an operating communication channel different from the operating communication channel of the first transceiver when both transceivers are operating simultaneously.

* * * * *